United States Patent [19]
Church et al.

[11] Patent Number: 5,987,725
[45] Date of Patent: Nov. 23, 1999

[54] METHOD FOR PARTING A SLIDER FROM A SLIDER ROW

[75] Inventors: Mark Anthony Church, Los Gatos; John C. Major, San Jose; Bruno Alejandro Valdes, Cupertino, all of Calif.

[73] Assignee: International Business Machines Corporation, Armonk, N.Y.

[21] Appl. No.: 08/918,323

[22] Filed: Aug. 26, 1997

[51] Int. Cl.[6] .............................. B23Q 17/00; B23P 17/00
[52] U.S. Cl. ................................... 29/407.05; 29/407.09; 29/603.12; 29/417
[58] Field of Search .............................. 29/407.04, 407.5, 29/407.09, 415, 417, 603.12, 603.16, 603.17; 83/76.1, 371; 364/468.21; 356/375

[56] References Cited

U.S. PATENT DOCUMENTS

| | | |
|---|---|---|
| 4,407,262 | 10/1983 | Wirz et al. . |
| 4,628,464 | 12/1986 | McConnell . |
| 4,712,970 | 12/1987 | Nakamura et al. . |
| 4,738,025 | 4/1988 | Arnold . |
| 4,839,300 | 6/1989 | Kawahara et al. . |
| 4,980,971 | 1/1991 | Bartschat et al. . |
| 5,094,381 | 3/1992 | Amos et al. . |
| 5,220,398 | 6/1993 | Horn et al. . |
| 5,389,182 | 2/1995 | Mignardi . |
| 5,509,554 | 4/1996 | Samuelson et al. ................. 29/603.12 |
| 5,531,017 | 7/1996 | Church et al. ....................... 29/603.12 |
| 5,752,309 | 5/1998 | Partee et al. ......................... 29/603.18 |

OTHER PUBLICATIONS

IBM Tech. Disclosure Bulletin, Optical Closed–Loop Surface–Mount Placement Procedure, Oct. 1988, vol. 31, No. 5, pp. 20–22.

IBM Tech. Disclosure Bulletin, Surface–Mounted Device Placement, Jun. 1987, vol. 30, No. 1, pp. 228–234.

*Primary Examiner*—David P. Bryant
*Attorney, Agent, or Firm*—Gray Cary Ware Freidenrich

[57] ABSTRACT

An apparatus, method, and article of manufacture to separate a slider from a slider row in which it was manufactured. The apparatus comprises an articulating robot including a stage which may be moved in X-Y coordinate directions and an articulating arm that may be used to place rows of sliders on the stage. The articulating arm incorporates a rotating effectuator unit mounted at the end of the arm, the effectuator being used to pick up individual slider rows, the tray in which they sit when first introduced to the robot, or any other item that needs to be positioned during the alignment of the rows. The apparatus includes sensors and a processing unit that may be used to detect and determine dimensional characteristics of an ABS surface of a slider integral to the row. The apparatus may also include a parting device for separating the slider from the row. In performing the method, a slider row is positioned on the stage in a manner that allows the ABS surface of a slider to be sensed by the sensors. Using the sensed data, the processing unit determines the location of the centroid of the ABS surface for the slider. The processing unit uses the centroid location of the ABS surface in establishing a parting position for parting the slider from the row.

19 Claims, 8 Drawing Sheets

METHOD FOR PARTING A SLIDER FROM A SLIDER ROW

BACKGROUND OF THE INVENTION

1. Field of the Invention

The present invention generally relates to a robotic system for positioning rows of sliders and a method for dicing the slider rows. More particularly, the invention concerns an apparatus, method, and article of manufacture for positioning and dicing the slider rows based upon a positional relationship of a slider's ABS centroid.

2. Description of the Related Art

In the manufacture of magnetresistive transducers used to retrieve data from direct access storage devices, the term slider is used to describe a unit that carries one or more magnetic heads and positions them for transduction with a disk surface in a disk drive. The slider is mounted in a head/gimble assembly (HGA) held at one end of a suspension system, and used for positioning the magnetic head. It is critical to the operation of the head that overall tolerances for the suspension system be maintained within predetermined limits.

Responsive to the drive toward reducing manufacturing costs, batch fabrication processes have been developed for efficient, high volume production of miniaturized magnetic heads on sliders. First, heads are manufactured, using well-known monolithic methods, on a substrate of slider material. Heads are typically constructed in multiples on the substrate. The substrate is then repeatedly sliced in order to separate individual sliders from the surrounding sliders. The substrate is first parted into rows, each row containing numerous sliders arranged in a single column fashion. Individual sliders are then parted from the slider row, with the parting defining a parting surface on the slider. To further increase efficiency, it is common for several sliders to be parted from several slider rows at one time using gang wheel parting.

Various gang wheel parting techniques are well known to those skilled in the art. Gang wheel parting technology reduces the number of passes that a parting machine must make across a row to separate the individual sliders. Unfortunately, a certain degree of precision is sacrificed when using gang wheel parting techniques. The precision with which individual sliders can be parted from a row using gang parting is limited by the cutting wheels used, the precision of the cutting machine, the use of wheel gangs to increase productivity, and fixture tolerances. Nonlinear wear characteristics of the cutting wheels performing the separation process, and the cumulative tolerance error caused by the cutting machine, gang wheels, and the fixtures, have pushed currently known parting systems to their limits for maintaining tolerance levels.

Commonly, slider manufacturing costs are reduced by increasing slider row fabrication densities. By increasing row densities, head manufacturing production can increase without facility expansion, and construction of a row uses substantially the same amount of resources. This equates to more product at the same expense. Increased slider row densities allow more sliders to be manufactured in a given slider row, but require very small parting lines between individual sliders. A recent high density slider manufacturing technology developed by the assignee corporation, for example, permits a maximum parting kerf of only 0.065 mm.

A major problem arises in assembling small sliders into head gimbal assemblies. One such problem concerns fly height performance. To achieve roll static attitude requirements for HGAs with very small sliders, the alignment of the slider ABS (air bearing surface) centroid to the suspension load point must be maintained to tighter tolerances than is possible using current parting techniques. The alignment of the ABS centroid to slider body for current slider designs available from the assignee corporation requires a tolerance as small as +/−10.0 $\mu$m, as measured from the parting surface of a slider body to the ABS centroid. Unfortunately, current technology is only capable of maintaining a tolerance of approximately +/−40 $\mu$m between the air bearing surface (ABS) centroid of a slider and the parting cut, and holding tighter tolerances using this batch fabrication regime is not currently possible.

One attempt to overcome the limitations of the current parting system limitations has been to improve the overall tolerance of the suspension assembly to which the slider is coupled. But due to the complexity of the typical suspension system, improving a suspension's cumulative tolerance adds prohibitive costs to the suspension assembly.

Accordingly, in order to maintain an ABS-centroid-to-parting-surface tolerance as required for state of the art sliders, new methods and machines for parting sliders from a slider row are needed.

SUMMARY OF THE INVENTION

Broadly, the present invention concerns an apparatus, method, and article of manufacture that satisfies the need for an efficient way to separate a slider from a slider row in which it is manufactured, while maintaining ABS-centroid-to-parting-surface tolerances as required by current slider technology.

One version of the present invention includes an apparatus comprising an articulating robot. The robot includes a stage which may be moved in the X-Y coordinate directions and an articulating arm that may be used to place rows of sliders on the stage. The articulating arm incorporates an effectuator unit mounted at the end of the arm. The effectuator may pick up individual slider rows, the tray in which the slider rows sit when first introduced to the robot, or any other item that needs to be positioned during the alignment of the rows. The robot may include a sensor and a processing unit that may be used to detect and determine the dimensional characteristics of an ABS surface of a row, a slider integral to the row, or all sliders integral to the row. One advantage to using a sensor to determine the dimensional characteristics of the ABS is that the hard stop fixturing used by the current technology is eliminated. Hard stop fixturing alone can account for parting tolerances which exceed a +/−10.0 $\mu$m requirement. The robot may also include a parting device for separating the sliders from the slider rows.

The invention also comprises a method that may be practiced by the apparatus or any other apparatus capable of performing the method steps. To perform one version of the method, a slider row is positioned on the X-Y stage in a manner that allows the ABS of a slider integral to the slider row to be sensed by the sensor. The sensed data is sent to the processing unit which determines the location of the centroid of the ABS for the slider. The processing unit uses the centroid location of the ABS to establish a location to part the slider from the slider row. By using the ABS centroid to determine the location of the parting cut, the tolerance between the ABS centroid and the parted surface can be tightly held. Furthermore, stability is gained in parting, thereby reducing the typical kerf width of current parting procedures which generally range from 0.045 to 0.085 mm.

The perpendicularity and surface finish of the parted side of the slider may also be improved.

In another version, multiple slider rows are similarly positioned for parting as described above. The first slider row is removably fixed to the X-Y stage so that its longitudinal axis is perpendicular to either the X- or the Y-axis. A second slider row is positioned so that its longitudinal axis is parallel to the longitudinal axis of the first slider, and in a manner that allows the ABS of a slider integral to the second slider row to be sensed by the sensor. The sensed data is sent to the processing unit and the location of the centroid of the ABS for the second slider is determined. Knowing the location of the two sliders' centroids, one of the sliders is repositioned so that the centroids are aligned. The second slider row is then removably fixed to the X-Y stage. This process is repeated until all slider rows are aligned.

An article of manufacture is included in one version of the invention. Generally, the article of manufacture includes a data storage medium tangibly embodying a program of machine readable instructions executable by a digital processing apparatus to perform the above method steps.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

One aspect of the invention concerns an apparatus which provides an efficient way to align multiple slider rows for attaining tighter slider parting tolerances. The slider rows are aligned in preparation for parting individual sliders from the slider rows in which they were manufactured. Other aspects of the invention include a method to perform the alignment and the parting, and an article of manufacture that comprises a data storage medium tangibly embodying a program of machine-readable instructions. The instructions are executable by a digital processing apparatus and are used to perform the alignment referenced above.

Figures 1, 2:
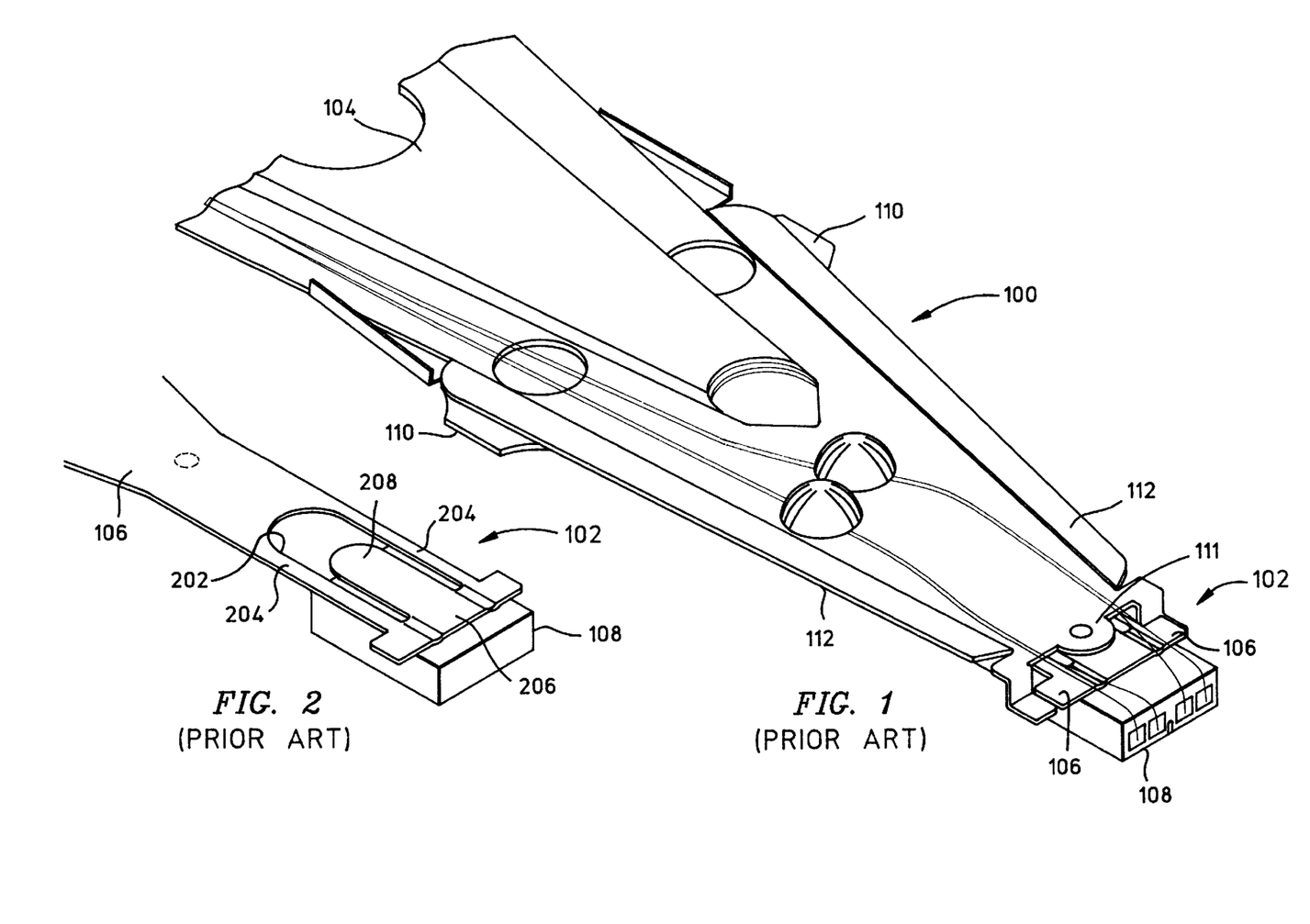
FIG. 1 is a prospective view of a prior art suspension system to which a slider is coupled.
FIG. 2 is a detailed view of the flexure of the prior art suspension system shown in FIG. 1.

To better understand the necessity for improved parting and alignment of the slider, FIG. 1 shows a prior art suspension system 100 which includes a head/gimbal (HGA) assembly 102 mounted to a load beam 104. As shown in FIG. 2, the prior art HGA 102 includes a flexure 106 which is a thin sheet of stainless steel. The flexure 106 has a window 202 bounded in part by a pair of legs 204 and a terminal end portion 206. Extending into and cantilevered within the window 202 is a tongue 208. The tongue 208 is connected at its base to the terminal end portion 206. A slider 108 is coupled to the tongue 208, such as by adhesive bonding, so that the tongue 208 acts as a gimbal, pivoting about load point dimple 111 formed into load beam 104, for movements of the slider 108 in roll and pitch during rotation of an adjacent disk in the disk drive.

Figure 3:
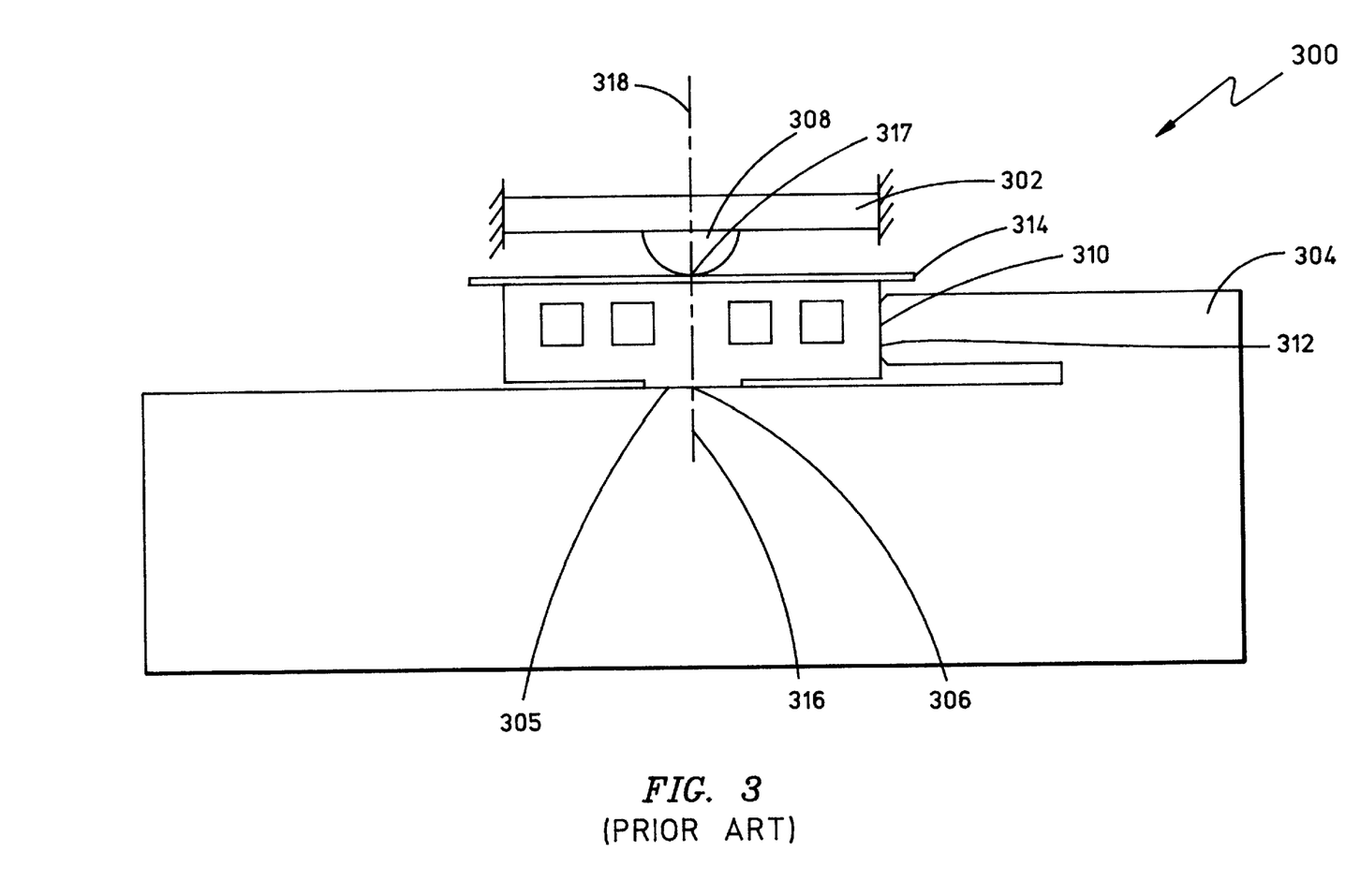
FIG. 3 is an illustrative diagram of a prior art fixture used to assemble the suspension system shown in FIG. 1.

FIG. 3 shows an end view of a slider 300, such as a center rail slider, and a suspension load beam 302, held in place by the slider attach fixture 304. The slider attach fixture shown is commonly used to assemble the suspension system 100 shown in FIG. 1. The slider 300 has an ABS 305 which has a slider ABS centroid 306 defining an ABS centroid centerline 316. The suspension load beam 302 includes a load point dimple 308 having a centroid 317 which defines a load point dimple centerline 318 which passes through the centroid.

Proper alignment of the slider 300 must be maintained when attaching it to the suspension load beam 302. The ABS centroid centerline 316 must be aligned with the load point dimple centroid centerline 318. To align the centerlines 316 and 318, a mechanical stop 310 of the slider attach fixture 304 receives and abuts a parting surface 312 of the slider 300. Fixture pins (not shown) locate the suspension load beam 302 relative to the mechanical stop 310. By accurately locating the suspension load beam 302 in the slider attach fixture 304, and by carefully controlling the manufacturing tolerances of the load beam 302, the position of the load point dimple 308 may be accurately located relative to the mechanical stop 310. The location of the ABS centroid 306 may be determined by the distance from the parting surface 312 abutting the mechanical stop 310 to the slider ABS centroid 306. This distance is set when the slider 300 is parted from the slider row in which it was manufactured. For example, when manufacturing one type of slider known in the art as a "pico" slider, the distance set by the parting must be controlled to 500.0 mm +/−10.0 $\mu$m including variations in perpendicularity and surface roughness. When manufacturing other types of sliders using the current invention, the distance set by the parting, and the tolerance required to be maintained, may be greater or lesser. In any case, current parting systems cannot maintain a +/−10.0 $\mu$m tolerance which can be substantially maintained by the present invention.

Figures 4A, 4B, 4C, 4D:
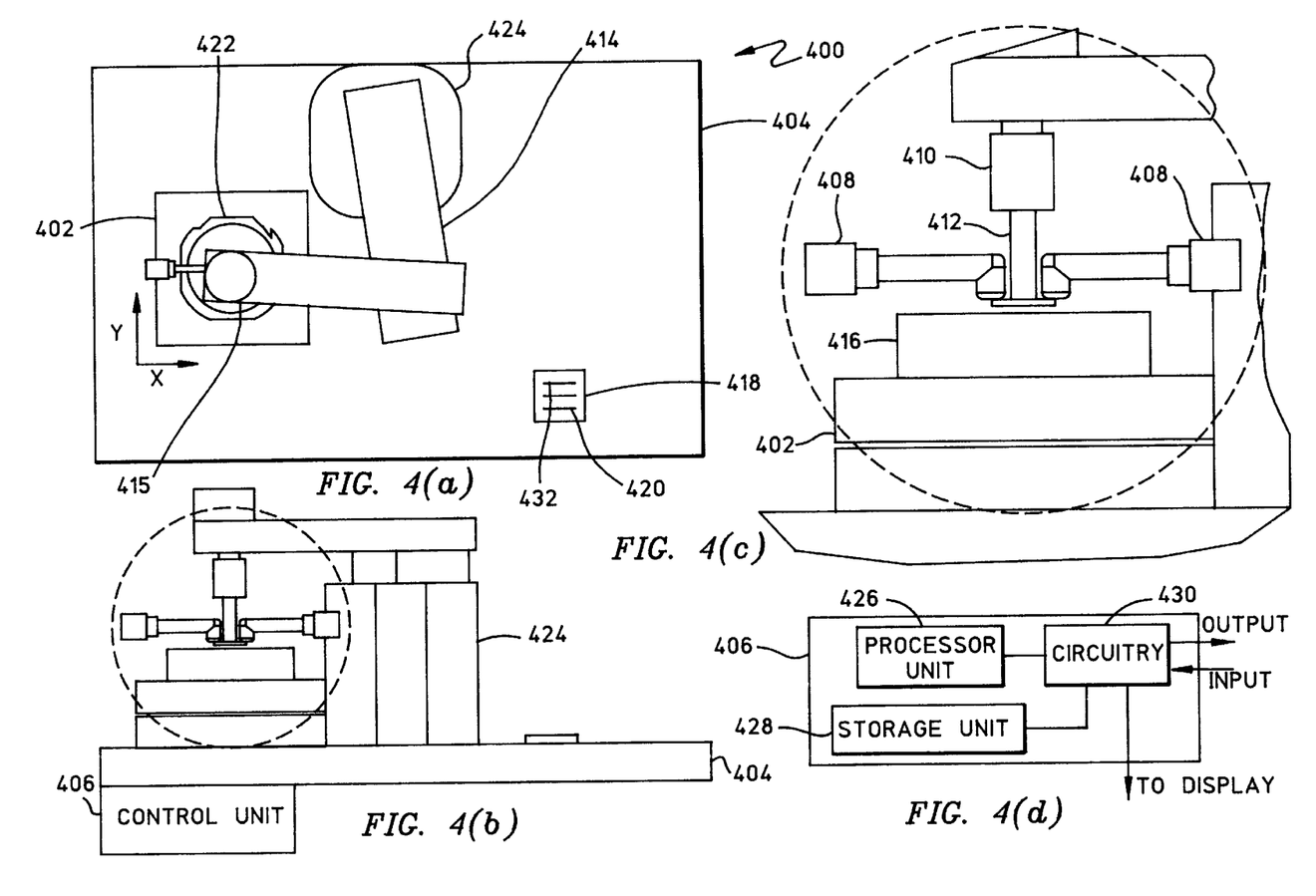
FIGS. 4(a) and 4(b) show a top view and a side view, respectively, of the apparatus used in accordance with one version of the present invention.
FIG. 4(c) is an exploded view of the sensor, stage and effectuator shown in FIG. 4(b) and marked as Detail 4(c)
FIG. 4(d) is a schematic block diagram of components included in the control unit shown in FIG. 4(b) in accordance with one version of the present invention.

FIGS. 4(a) through 4(c) show one version of the apparatus of the present invention designed to align a slider row using the slider's ABS centroid as a parting reference. FIG. 4(a) shows an articulating robotic system 400 including a base plate 404 supporting a stage 402. In the preferred embodiment, an X-Y stage, commonly known in the art for movement in only the X and Y coordinate directions, is used. However, any stage which allows an article placed upon it to be repositioned at will may be used. For simplicity sake, but not by way of limitation, use of an X-Y stage will be used to discuss the present invention.

A movement device for moving the X-Y stage 402 in the X or Y direction is provided but not shown, but the typical device may be an electrical drive such as an electrical motor powering a screw-type displacement mechanism. A drive device 424 is supported by the base plate 404 and is used for moving articulating arms 414 and 415. Arm 414 is rotatably connected to the drive 424 at one end and is articulably connected to articulating arm 415 at an opposite end. The articulating arms 414 and 415 are used to position objects on the X-Y stage 402. An effectuator 412 is coupled to the articulating arm 415 at an end opposite to an end where articulating arm 415 connects to articulating arm 414. Preferably, the effectuator 412 is rotatably coupled to the articulating arm 415; however, it may be attached in any other suitable way as long as it maintains its ability to assist in grasping and moving an object. A tray 418 containing a multiplicity of slider rows 420 is shown sitting on top of the base plate 404. The tray 418 is shown in one position which allows it to be easily accessed by the articulating arms 414 and 415 of the articulating robot system 400. However, the slider rows 420 may be introduced to the robot system 400 in numerous ways, and positioned in a variety of locations, as required to facilitate efficient movement of the articulating arms. For example, the tray 418 may be replaced by an automated delivery belt.

FIG. 4(b) shows a side view of the articulating robotic system 400 shown in FIG. 4(a). A control unit 406 is attached to the base plate 404. However, the control unit need not be physically attached to the base plate and may be at a location removed from the robot system 400 so long as the control unit remains communicatively connected to the robot system. One of the functions of the control unit 406 is to control the movement of the movement device controlling the stage 402, the articulating arms 414 and 415, the drive device 424, and the effectuator 412. In one embodiment, the control unit may include a processor unit 426, such as the Motorola MC 68322, a storage unit 428, and circuitry 430. A storage unit 428 may be used to temporarily or permanently store data or commands received by the control unit 406. The circuitry 430 communicatively connects the processor unit 426 with the storage unit 428 using elements commonly known to those experienced in the control circuitry art. In another version, the circuitry 430 may also include elements such as memory, a processor, logic gates, a floppy or CD-rom drive, or any other digital or analog device commonly found in control units.

Input/output data and commands may be routinely sent and received by the control unit 406. Input may be received from a user interface, such as a keyboard or audio signal. or directly from a data and command storage medium. Moreover, a display may be electrically connected to the control unit 406 so that any input or output from the control unit may be observed. The display may comprise a visual display, an audio display, or any other typical display used for monitoring controlled systems. The control unit 406 may also receive input data from at least one sensor device 408 shown in FIG. 4(c). The sensor device 408 is communicatively connected to the control unit 406 and is positioned in such a manner as to allow the ABS surface of a slider row to be sensed after the slider has been introduced to the robot system 400. The sensor may be physically attached to the base plate 404, the articulating robotic system 400, or in any manner which would allow the sensor 408 to sense the sliders 420 without restricting the movement of the articulating arms 414 and 415 or the effectuator 412. As shown in FIG. 4(c), the effectuator 412 may include a pick-up unit 410. The pick-up unit 410 is a temporary holding system which at least allows an individual slider row to be picked up by the articulating arms 414 and 415. The pick-up unit may be a vacuum cylinder, mechanical fingers, a magnetic field, or any such similar device. Furthermore, the effectuator 412 may be equipped with an additional rotation mechanism not shown, attached to articulating arm 415, which allows the effectuator to rotate independent of the articulating arm 415.

OPERATION

In addition to the various hardware embodiments described above, a different aspect of the invention concerns a method for positioning a slider for parting from the slider row in which it was manufactured. Such a method may be implemented, for example, by operating the processor unit 426 to execute a sequence of machine readable instructions, as described below.

Data Storage Device

Such a method may be implemented, for example, by operating the control unit 406 to execute a sequence of machine-readable instructions. These instructions may reside in various types of data storage units located either in the control unit 406, an external host, or in the communication channels connecting an external host to the control unit. In this respect, one aspect of the present invention concerns an article of manufacture, comprising a data storage medium tangibly embodying a program of machine-readable instructions executable by a digital data processor to perform method steps to position a slider from the slider row in which it was manufactured. In another aspect, the slider may then be parted from the row.

Figure 5:
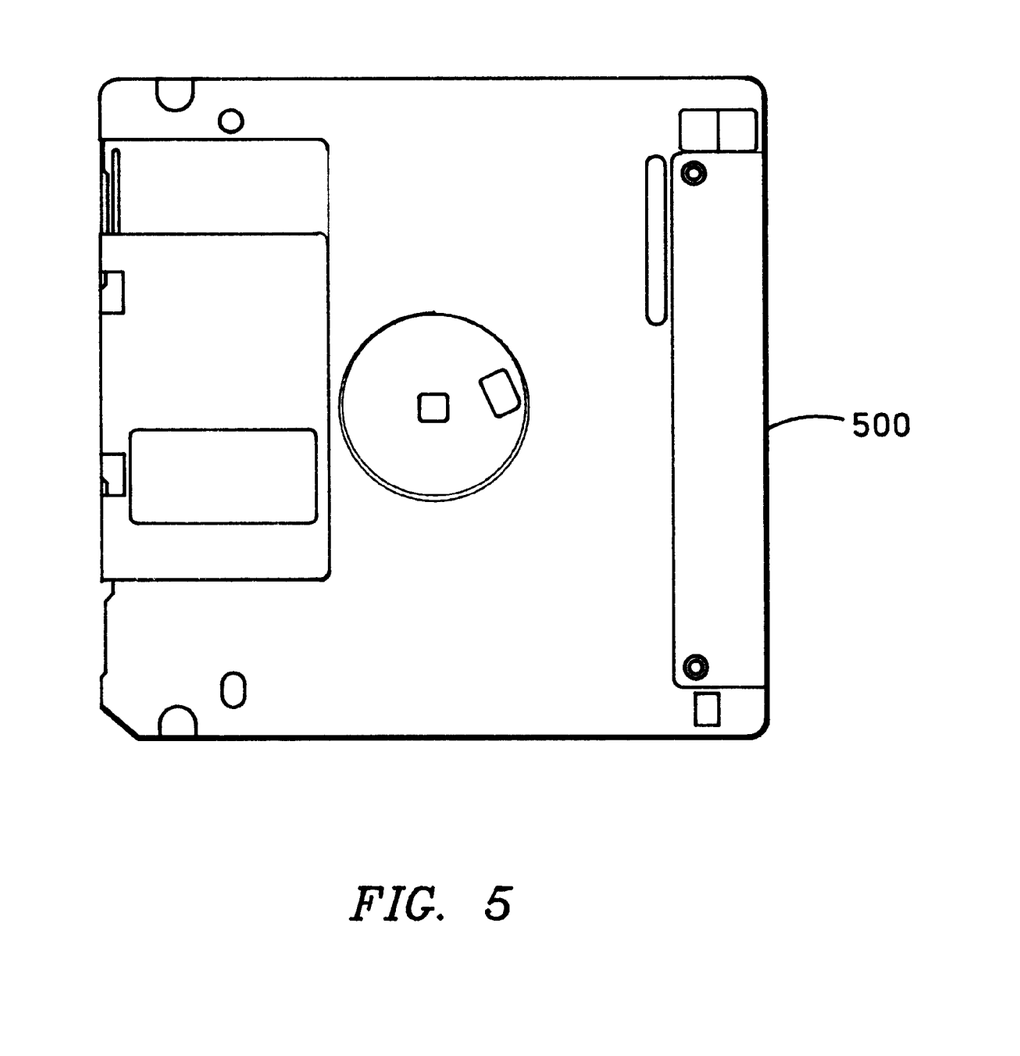
FIG. 5 is an exemplary embodiment of a data storage device used in one version of the invention.

This data storage medium may comprise, for example, memory units contained within the storage unit 428. The memory units may be located within the communication channels of the circuitry 430, within the processor unit 426, or any other location accessible to the control unit 406. Alternatively, the instructions may be contained in separate data storage medium, such as a magnetic data storage diskette 500 (FIG. 5). Whether contained in a storage unit, the diskette 500, or elsewhere, the instructions may instead be stored on another type of data storage medium such as one or more nodes of a network system, DASD storage (e.g., a conventional "hard drive" or a RAID array), magnetic tape, electronic read-only memory (e.g., CD-ROM or WORM), optical storage device (e.g., WORM), paper "punch" cards, or other data storage media. In an illustrative embodiment of the invention, the machine-readable instructions may comprise lines of compiled "C-type" or other source code language.

Overall Sequence of Operation

Figure 6:
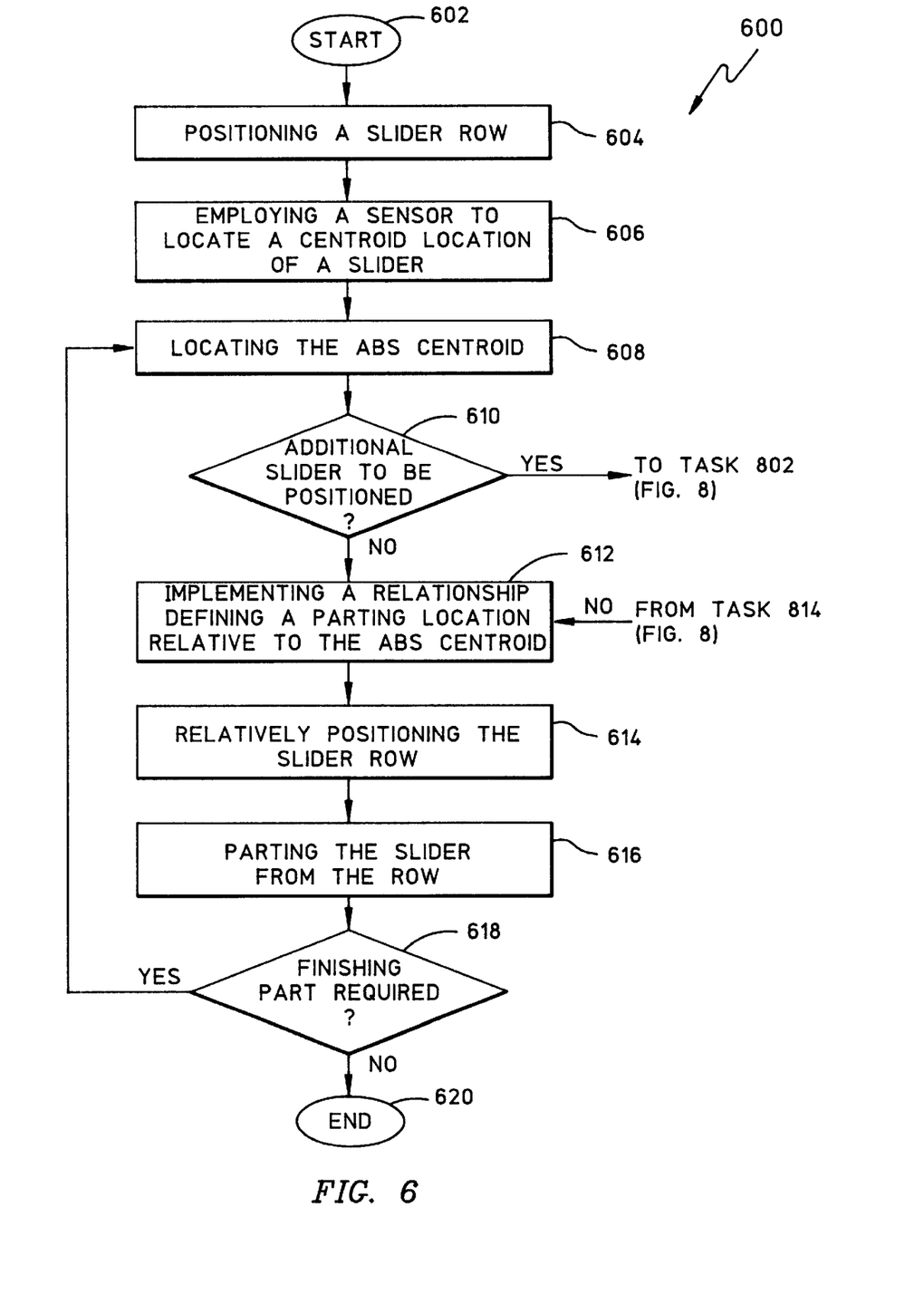
FIG. 6 is a flow diagram depicting the method of one version of the present invention.

FIG. 6 generally shows one method in accordance with the present invention which may be used to align one or more slider rows in preparation for parting a slider from a row. Although the method 600 described in FIG. 6 includes parting a slider from the row in task 616, the method may also be practiced without actually parting the slider from the row. FIGS. 7(a) through 7(e) illustrate steps of the method in greater detail. The method 600 is easily explained in connection with the articulating robotic system 400 shown in FIGS. 4(a) through 4(d). However, it should be understood that the method may be implemented by not only the robot system 400, but any other apparatus, such as an X-Y robot, that is equipped to perform the method steps.

Figures 7A, 7B, 7C:
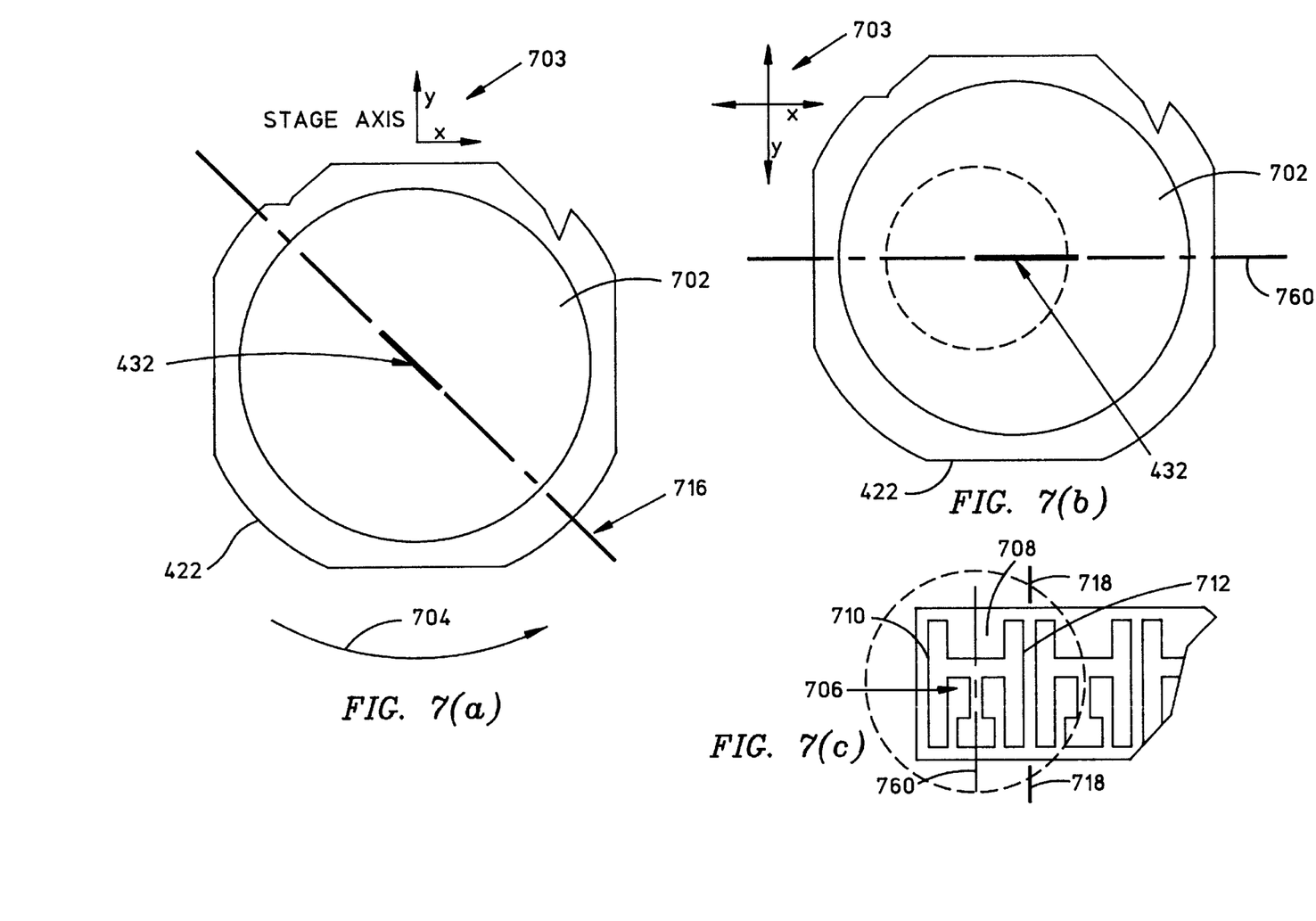
FIGS. 7(a)–7(e) detail particular steps of the method illustrated in FIG. 6 and followed in accordance with one version of the invention.

The method 600 begins in task 602 when a slider row is presented to the articulating robotic system 400. The presentation may be made in any manner; however, introducing a slider using the tray 418 is typical of one method in which slider rows are handled. The rows are positioned in the tray and then introduced to the system 400. In task 604, a slider row is positioned on the stage 402 when the control unit 406 signals the articulating arms 414 and 415. The effectuator 412 engages a first slider row 432 and causes the slider row 432 to be picked up and positioned so that sensor 408 may sense the ABS of the slider row 432. As shown in FIG. 7(a), the slider row 432 is then rotated as shown by arrow 704 in order to bring a longitudinal center line 716 of the first slider row 432 perpendicular to the Y axis of the X-Y stage 402. The axes of the stage 402 are represented in FIGS. 7(a)–(b), and 7(d) by the axis arms 703 shown at the top of the figure. The slider row is rotated into position by moving the articulating arms 414 and 415 as instructed by the control unit 406 which receives positional input from the sensor 408. FIG. 7(b) shows the slider row 432 when it is properly positioned with its longitudinal center line 760 perpendicular to one axis, in this case the Y axis, of the X-Y stage 402. The control unit 406 then controls the articulating robotic system 400 to lower the first slider row 432 onto an adhesive surface 702 of the tape fixture 422. The first slider row 432 is pressed onto the adhesive surface 702 with sufficient force to cause it to be removably attached to the tape fixture 422 and the effectuator 412 releases the row. The first slider row 432 may be positioned at any location on the adhesive surface 702, although it is preferred that it be positioned centrally about the tape fixture 422. The adhesive surface 702 may be adhesive tape, a vacuum hold down, a magnetic hold down, or any other method suitable for holding the first slider row 432 to the tape fixture 422.

Employing sensor 408 in task 606, the control unit 406 senses the ABS 708 of a slider integral to the slider row. As shown in FIG. 7(c), the ABS 708 is defined by first ABS edge 710 and a second ABS edge 712. The location of the first ABS edge 710 and the second ABS edge 712 are sensed by the sensor 408 and used to determine the location of the ABS centroid 706. The centroid has a centerline 760 which is positioned perpendicular to the longitudinal center line 706 of the first slider row 432. In the preferred embodiment of the present invention, the location of the ABS centroid 706 is calculated based on an ABS fly height model. The ABS fly height model method is well-known to those skilled in the art and is used to compensate for feature errors which may result in roll altitude error. Roll altitude error can cause the MR head contained in a slider to be damaged or under perform when placed in service. However, roll altitude error can be minimized by adjusting the location of a parting cut 718 as discussed below in task 612. The parting cut 718 may also be adjusted to improve flight characteristics of the slider parted, such as improvements in rotation which occur during flight. After the ABS centroid 706 has been located in task 608, if additional slider rows need to be similarly positioned, they may be aligned as described in FIG. 8.

Assuming no further rows remain to be positioned in task 610, a relationship between the desired location for the parting surface 312, shown in FIG. 3, and the ABS centroid 706, is used to determine in task 612 the location of the parting cut 718. In task 614, the first slider row 432 is positioned to place the location of the parting cut 718 relative to the location of the parting device. In one embodiment, the parting device comprises a parting wheel. A test parting may be performed to calibrate the parting device prior to parting the sliders from their rows.

The parting wheel mentioned above has a Du face, the Du face being the part of the wheel that is juxtaposed to and faces the parting surface 312 of a slider during the parting process. The test parting is used to establish the location of the Du face of the parting wheel and to pre-set the parting mechanism of the parting machine. This is a standard practice for machine set-up and is widely understood by those skilled in the parting arts. The location of the Du face of the cutting wheel is sensed by a sensor during the calibration parting and copied to the control unit 406 so that the parting device movement is preset. Knowing the location of the ABS centroid 706 and the Du face of the parting wheel, the control unit 406 establishes the parting cut 718 and positions the parting device and the first slider row 432 in accordance therewith. In one version, the parting device engages the first slider row 432 and parts a slider from the row.

In another version of the present invention, after the slider has been parted from the row, the sensor 408 senses the distance from the ABS centroid 706 to the location of parting cut 718. This sensed data is received by the control unit 406 and in task 618, the control unit 406 determines whether a finishing step is required. A finishing step may be required if the location of the parting cut 718 needs to be adjusted so that specified tolerances may be maintained. For example, the finishing part may be corrected for any deficiency in the original parting, such as minor parting wheel wear or run-out which can slightly offset the parting wheel and therefore the parting location. If a finishing step is required, a finishing part is performed in task 618 in which task 608 through 618 are repeated. If no finishing is required, then the method ends in task 620.

Figure 7D:
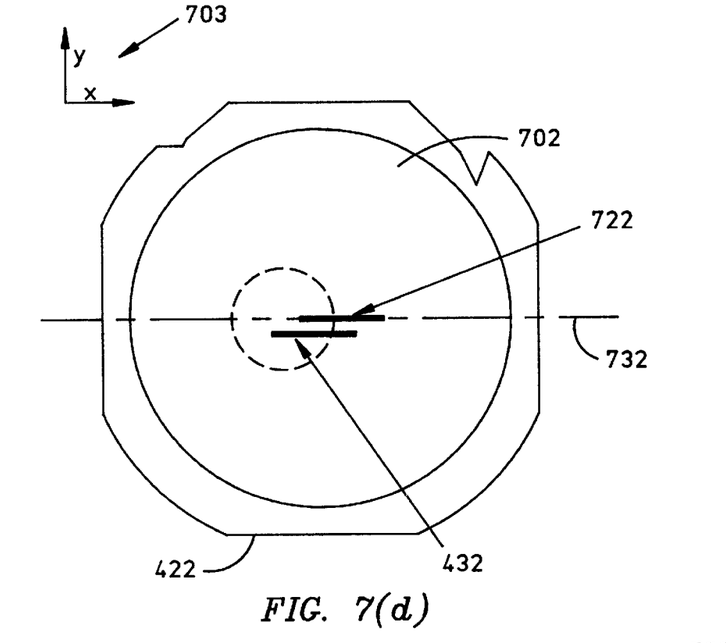
Figure 7E:
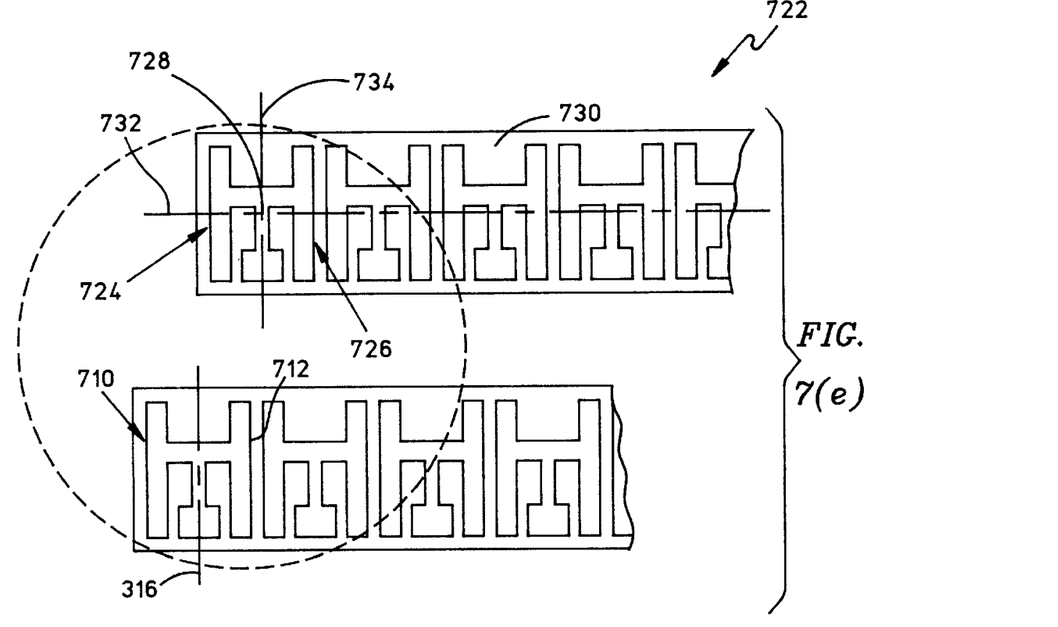
Figure 8:
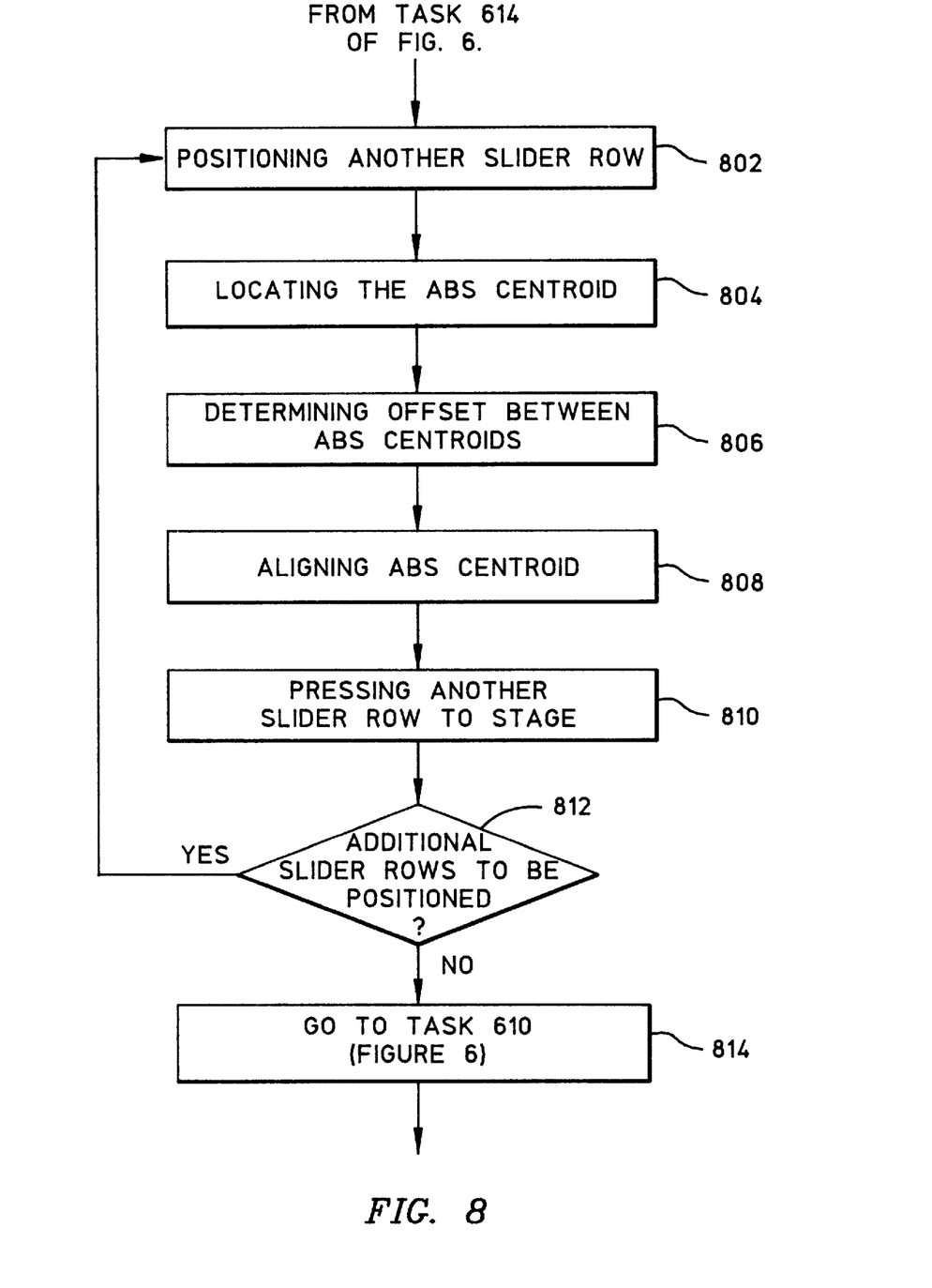
FIG. 8 is a flow diagram showing additional steps to the method shown in FIG. 6 and used to position multiple slider rows in accordance with one version of the present invention.

In the embodiment described above, a first slider row 432 was positioned for parting a slider from the row. However, as indicated in task 610, more than one slider row may be positioned so that one pass of the cutting wheel will result in multiple sliders being parted from multiple slider rows. FIG. 8 shows one embodiment of additional steps required for positioning multiple slider rows. After the first slider row 432 has been positioned, as described in tasks 602 through 608, the control unit 406 may instruct the articulating robotic system 400 to pick up a second slider row 722 shown in FIG. 7(d) and position it so that the second ABS 730 (having first and second ABS edges 724 and 726) of the second slider row 722 may be sensed by the sensor 408. The second slider row 722 is rotated until the second longitudinal center line 732 of the second slider row 722 is perpendicular to the Y-axis of the stage 402 as shown in FIG. 7(d). The control unit 406, using the data sensed by sensor 408, locates the ABS centroid 706 of the first slider row 432 and the second ABS centroid 728 of a slider integral to the second slider row 722. The control unit 406 calculates the offset between the two centroids relative to their position along the axis of the stage 402 which is parallel to the longitudinal centerline 732. Knowing the offset between the ABS centroid 706 and the second ABS centroid 728, the control unit 406 causes the centroids to be aligned. In one version, the control unit 406 instructs the stage 402 to move the offset distance. This movement aligns the ABS centroid 706 with the second ABS centroid 728 so that the central centerline 734 which passes through the centroid 728 and is perpendicular to the longitudinal centerline 732, is aligned with the centroid centerline 760 of the first slider row 432. Once the centroids are aligned, the control unit 406 causes the articulating robotic system 400 to lower the second slider row 722 onto the adhesive surface 702 of the tape fixture 422. The second slider row 722 is pressed onto the adhesive surface with sufficient force to secure the second slider row 722 to the tape fixture 422. The effectuator 412 releases the second slider row.

In task 812 the control unit 406, determines whether additional slider rows are to be positioned. If additional slider rows are to be positioned, tasks 802 through 812 of FIG. 8 are repeated. If no further slider rows are to be positioned, the method returns to task 610 as shown in FIG. 6 and tasks 610 through 620 are executed. The method described in FIG. 8 may be repeated for any number of additional slider rows.

OTHER EMBODIMENTS

While there have been shown what are presently considered to be preferred embodiments of the invention, it will be apparent to those skilled in the art that various changes and modifications can be made herein without departing from the scope of the invention as defined by the claims. For example, the present invention was discussed relative to the use of a parting wheel which included a Du face. This type of parting device, a parting wheel, is commonly used and known in the art. However, other parting devices such as a laser, a band saw, a shear, chemical parting, or other similar devices may be used. Accordingly, the above description of the present invention should not be interpreted to limit the scope of the appended claims.

What is claimed is:

1. A method for positioning a slider row relative to a parting device so that one or more sliders can be parted from the row, comprising:
   (a) positioning a slider row relative to a sensor, said slider row having a plurality of sliders integral thereto, each slider including an air bearing surface (ABS) having a width Z;
   (b) the sensor sensing a centroid location for an ABS of a first slider in the slider row;
   (c) implementing a relationship defining a first slider parting location relative to said first slider ABS centroid location;
   (d) relatively positioning said slider row and the parting device based upon said relationship so that the parting device is in a position to part a slider from a slider row at said parting location;
   (e) using said parting device to part said first slider from said slider row; and
   (f) performs steps (a)–(e) for all sliders integral to said slider row.

2. The method recited in claim 1, further including the steps of:
   sensing further to determine whether a finishing step is required to compensate for any parting error inflicted on any parted slider; and
   if a finishing step is required, performing a finishing step on each parted slider.

3. The method recited in claim 2, wherein locating said ABS centroid location includes the steps of:
   sensing dimensional characteristics of said ABS of said first slider;
   copying said dimensional characteristics to a processing unit; and
   determining said location of said ABS centroid using said processing unit and said copied dimensional characteristics.

4. The method recited in claim 3, wherein said ABS centroid location is calculated as $C_{ABS}=Z/2$.

5. The method recited in claim 3, wherein said ABS centroid location is calculated based upon an ABS fly height model.

6. The method recited in claim 3, wherein said parting device is calibrated prior to paring any slider from said slider row.

7. The method recited in claim 6, wherein said relationship between said parting device and said ABS centroid location may be determined as M=C+X−W, where C=said ABS centroid location, X=½ Z, and W is determined by establishing a location of a Du side of said parting device during calibration, said Du side of said parting device being juxtaposed to a parting side of a slider as said slider is parted from a slider row.

8. The method recited in claim 1, further comprising:
   (g) positioning an $N_i$ slider row to allow its location and an ABS of a second slider integral thereto to be sensed by said sensor, said $N_i$ slider row including a longitudinal center line, said second slider including an ABS centroid location and a latitudinal center line passing therethrough, wherein $N_i$ resents each additional slider row to be positioned;
   (h) using said sensor to locate said second slider's ABS centroid location, wherein locating said ABS centroid location includes the steps of:
   sensing dimensional characteristics of said ABS of said second slider including an ABS surface width Z;
   copying said dimensional characteristics to a processing unit; and
   using said processing unit to determine said location of said second slider ABS centroid using said copied dimensional characteristics;
   (i) positioning said $N_i$ slider row near an adjacent slider row, said adjacent slider row comprising:
   a longitudinal adjacent slider row center line; and
   a plurality of sliders integral to said adjacent slider row, each slider including:
   an ABS surface;
   an ABS centroid location; and
   a latitudinal center line passing through said ABS centroid location substantially perpendicular to said longitudinal adjacent slider row center line;
   wherein positioning said $N_i$ slider row near an adjacent slider row includes causing said latitudinal center line of said second slider to be substantially coaxial with said latitudinal center line of said slider integral to said adjacent slider row; and
   (d) repeating steps (g) through (i) for all remaining $N_i$ slider rows.

9. The method recited in claim 8, wherein aligning the latitudinal centerlines to be coaxial comprises:
   (a) establishing a longitudinal datum reference;
   (b) measuring points A and B in reference to said longitudinal datum reference, each of said points A and B corresponding to a location of an edge of said ABS of a slider integral to said $N_i$ slider row;
   (c) determining the location of said ABS centroid of said slider of said $N_i$ slider row;
   (d) measuring points C and D in reference to said longitudinal datum reference, each of said points C and D corresponding to a location of an edge of said ABS of a slider integral to said adjacent row;
   (e) determining the location of said ABS centroid of said slider of said adjacent slider row;
   (f) calculating an offset distance E of said latitudinal center lines where $E=|(A+B-C-D)/2|$; and
   (g) repositioning at least one of said slider rows said offset distance E to align said latitudinal centerlines.

10. The method recited in claim 8, wherein said ABS centroid locations are calculated based upon an ABS fly height model.

11. The method recited in claim 8, wherein said ABS centroid locations are calculated as $C_{ABS}=Z/2$.

12. A method for positioning multiple slider rows relative to a parting device so that one or more sliders can be parted from the rows, comprising:

(a) positioning a first slider row, said first slider row having a plurality of sliders including a first slider integral thereto, each slider of the first slider row including an air bearing surface (ABS), wherein the ABS of the first slider can be sensed by a sensor;

(b) positioning a second slider row relative to the first slider row, said second slider row hang a plurality of sliders including a second slider integral thereto, each slider of the second slider row including an ABS, wherein the ABS of the second slider can be sensed by said sensor;

(c) employing said sensor to locate a centroid location of the ABS of said first slider using said sensor;

(d) employing said sensor to locate a centroid location for the ABS of said second slider using said sensor;

(e) aligning said first slider ABS centroid with said second slider ABS centroid along a common axis;

(f) implementing a relationship defining a slider part location relative to said first slider ABS centroid location;

(g) relatively positioning said slider rows and the parting device based upon said relationship so that the parting device is in a position to part a slider from the first and second slider rows at said parting location;

(h) using the parting device to part said first slider from said first slider row and said second slider from said second slider row; and, (i) repeating steps (a)–(i) for all remaining sliders integral to the first and second slider rows.

13. A method for positioning a slider row relative to a parting device for parting a slider from the slider row, comprising:

(a) positioning a first slider row, said first slider row having a plurality of sliders integral thereto, each slider including an air bearing surface (ABS) having a width Z, wherein the ABS of at least one of said sliders may be sensed by a sensor;

(b) employing said sensor to locate a centroid location for said ABS of a first slider using said sensor, comprising:
(i) sensing dimensional characteristics of said ABS of said first slider;
(ii) copying said dimensional characteristics to a processing unit; and
(iii) determining said location of said ABS centroid using said processing unit and said copied dimensional characteristics;

(c) determining a relationship between a parting location and said first slider ABS centroid location;

(d) positioning an $N_i$ slider row to allow a position of said $N_i$ slider row and an ABS of a second slider integral thereto to be sensed by said sensor, said $N_i$ slider row including a longitudinal center line, said second slider including a slider latitudinal center line passing through an ABS centroid location of said second slider, wherein $2 \leq i \leq n$ and n is the total number of slider rows to be positioned;

(e) locating said ABS centroid location for said second slider using said sensor, wherein locating said ABS centroid location includes the steps of:
(i) sensing dimensional characteristics of said ABS of said second slider including an ABS surface width Z;
(ii) copying said dimensional characteristics to a processing unit; and
(iii) using said processing unit to determine said location of said ABS centroid using said copied dimensional characteristics;

(f) positioning said $N_i$ slider row near said first slider row, said first slider row comprising:
(i) a longitudinal first slider row center line; and
(ii) a plurality of sliders integral to said first slider row, each slider including:
(A) an ABS surface;
(B) an ARS centroid location; and
(C) a latitudinal center line passing through said ABS centroid location substantially perpendicular to said longitudinal first slider row center line;
wherein positioning said $N_i$ slider row near said first slider row includes causing said latitudinal center line of said second slider to be substantially coaxial with said latitudinal center line of said first slider integral to said first slider row; and (g) repeating steps (d) through (g) for all remaining $N_i$ slider rows.

14. The method recited in claim 13, wherein causing the latitudinal centerlines to be substantially coaxial comprises:

establishing a longitudinal datum reference;

measuring points A and B in reference to said longitudinal datum reference, said points A and B corresponding to a location of an edge of said ABS of a slider integral to said $N_i$ slider row to determine the location of said ABS centroid of said second slider of said $N_i$ slider row;

measuring points C and D in reference to said longitudinal datum reference, said points C and D corresponding to a location of an edge of said ABS of a slider integral to said adjacent row to determine the location of said ABS centroid of said first slider of said first slider row;

calculating an offset distance E of said latitudinal center lines where $E=|(A+B-C-D)/2|$; and repositioning at least one of said slider rows said offset distance E to align said latitudinal centerlines.

15. The method recited in claim 14, further including the steps of:

(h) relatively positioning slider rows with respect to a parting device based upon said relationship between said parting location and said first slider ABS centroid location, said positioning used to position said parting location so that the parting device will part at least one slider from said slider rows in which the slider was manufactured at said parting location;

(i) parting said at least one slider from said slider rows, using said parting device;

(j) determining whether a finishing step is required to compensate for any parting error;

(k) performing a finishing step on said at least one slider; and repeating steps (a)–(k) for all sliders integral to said slider row.

16. The method recited in claim 15, wherein said parting device is calibrated prior to parting any slider from any slider row.

17. The method recited in claim 16, wherein said relationship between said parting device and said ABS centroid location of a slider may be determined as $M=C+X-W$, where $C$=said ABS centroid location, $X=\frac{1}{2} Z$, and W is determined by establishing a location of a Du side of said parting device during calibration, said Du side of said parting device being juxtaposed to a parting side of a slider as said slider is parted from a slider row.

19. The method recited in claim 17, wherein said ABS centroid location is calculated based upon an ABS fly height model.

18. The method recited in claim 17, wherein said ABS centroid location is calculated as $C_{ABS}=Z/2$.

* * * * *